United States Patent
Burks et al.

[11] Patent Number: 6,002,996
[45] Date of Patent: Dec. 14, 1999

[54] NETWORKED SENSOR SYSTEM

[75] Inventors: Gregory L. Burks, Columbia; Dennis E. Fort, Silver Spring; Erika L. S. Spencer; Hans P. Widmer, both of Columbia, all of Md.

[73] Assignee: The Johns Hopkins University, Baltimore, Md.

[21] Appl. No.: 08/979,266

[22] Filed: Nov. 26, 1997

[51] Int. Cl.[6] .................................................. G06F 17/40
[52] U.S. Cl. .................... 702/188; 340/870.01; 370/280; 710/8; 709/217; 709/220
[58] Field of Search ........................... 702/188; 364/130, 364/138, 140.02, 468.15; 340/870.01; 395/200.31, 200.47, 200.53, 200.83, 821, 828, 835, 882, 280, 284, 200.87, 200.81, 200.5; 370/280, 306, 309; 710/8; 709/217, 220

[56] References Cited

U.S. PATENT DOCUMENTS

| | | | |
|---|---|---|---|
| 4,782,330 | 11/1988 | Tindall et al. | 340/541 |
| 4,991,123 | 2/1991 | Casamassima | 364/550 |
| 5,005,142 | 4/1991 | Lipchak et al. | 364/550 |
| 5,335,186 | 8/1994 | Tarrant | 364/550 |
| 5,353,009 | 10/1994 | Marsh et al. | 340/505 |
| 5,430,663 | 7/1995 | Judd et al. | 364/550 |
| 5,602,852 | 2/1997 | Shiobara | 370/455 |
| 5,623,565 | 4/1997 | Blair et al. | 385/24 |
| 5,680,239 | 10/1997 | Liva et al. | 395/143 |
| 5,687,391 | 11/1997 | Judd et al. | 395/835 |
| 5,694,323 | 12/1997 | Koropitzer et al. | 364/464.1 |
| 5,706,278 | 1/1998 | Robillard et al. | 370/222 |
| 5,809,220 | 9/1998 | Morrison et al. | 395/182.1 |

*Primary Examiner*—Patrick Assouad
*Attorney, Agent, or Firm*—Carla Magda Krivak

[57] ABSTRACT

A networked sensor system that simultaneously acquires, processes, and transmits sensor data under the control of a central processing unit. The system includes sensors connected to sensor processing modules. The sensor processing modules are serially coupled together and to the central processing unit by a fiber optic network. The central processing unit can change the sensor sampling rate by changing a global clock rate, can describe the number and layout of sensor processing modules and their associated sensors allowing for reconfiguration in accordance with a desired application, and can download code to the sensor processing modules for modifying processing functions for a given application. The global clock also allows for synchronous sampling throughout the network. Sensor gain in the sensor processing modules is dynamically programmed by the central processing unit.

21 Claims, 2 Drawing Sheets

NETWORKED SENSOR SYSTEM

STATEMENT OF GOVERNMENTAL INTEREST

The Government has rights in this invention pursuant to Contract No. N00039-95-C-0002 awarded by the Department of the Navy.

BACKGROUND OF THE INVENTION

1. Field of the Invention

The present invention is directed to continuous, real time, high speed, programmable data collection and processing. More particularly, the present invention is directed to a network of intelligent sensor processing modules (SPs) which simultaneously acquire, process and transmit sensor data under the control of a central processor.

2. Discussion of the Related Art

Sensors are used in many environments for many reasons. They can detect noise, vibrations, faults, light, heat, etc. Sensor systems are systems of sensors that receive and forward information. One existing system cables analog outputs to a single location. The sensors are grouped together to form centralized hubs (localizers) which are connected together. This results in long cable runs between the sensors and localizers. In addition, this poses cost installation problems due to the cost of running all the cables from the sensors to the localizers. The system then splits the outputs between an analog summing amplifier and a localizer. The localizer interfaces directly with individual transducers. The localizer includes an analog conditioner which filters and rectifies the sensor outputs. An analog sum is output from each sensor group to an analyzer. The analyzer performs real time detection of transients on coherent sums of each sensor group. Rack and equipment space is required by each of the localizers as well as the central processor. Another problem is electromagnetic interference (EMI) which can contaminate low level sensor signals over the long cable runs.

Another existing system uses a distributed acquisition method for lower bandwidth sampling. The raw individual data samples are serially transmitted. The number of sensors are constrained by the sampling rate and transmission bandwidth. Increasing the sampling rate decreases the number of sensors that can be received over one medium, so potentially a large number of cables might have to be utilized to bring all of the data back to a central location. All of this data is transmitted to a central location where it is to be processed. The central processor must transfer and process large amounts of data. Space must be available to accommodate a large central processing system and the related procurement costs are high.

Neither of the above-mentioned systems, nor any similar systems, reduce cabling, cabling costs or central processor complexity while increasing configuration flexibility, sampling rates, and the number of sensors. Further, none of the systems known in the art provide a network of sensors that simultaneously acquire signals, process commands, process the data into sums and energy footprints, and transmit sensor data under the control of a central processor.

SUMMARY OF INVENTION

It is an object of the present invention to provide a networked sensor system with a highly portable, distributed sensor processing module employing local processing.

It is another object of the present invention to provide a networked sensor system that is easily reconfigurable.

It is yet another object of the present invention to provide a networked sensor system that uses fiber optic cable and has a high data rate.

It is a further object of the present invention to provide a networked sensor system including a network of sensor processing modules which serially pass data and clock signals over a fiber optic network.

It is yet a further object of the present invention to provide a networked sensor system including a network of sensor processing modules in which each sensor processor contains a digital signal processor that processes data according to one of multiple programs stored in a non-volatile memory, the central processor switching programs running on any and all sensor processing modules within seconds.

It is still another object of the present invention to provide a networked sensor system including a network of sensor processing modules which simultaneously acquire, process and transmit sensor data.

These objects and advantages are achieved by providing a networked sensor system including a central processing unit, distributed sensor processing modules, sensors connected to the sensor processing modules, fiber optic cabling, and a power supply for supplying power to the system. A fiber optic network passes the data and clock signals. The sensor processing modules include a low noise signal conditioning unit for amplifying low level signals from the sensors with a selectable step gain amplifier and for providing a buffered output, an analog-to-digital converter for sampling the output from the low noise signal conditioning unit, and a digital signal processing chip for processing data according to programs stored in the central processing unit. The analog-to-digital converter samples the data at a programmable rate. A global clock signal originates at the central processing unit where the data sampling rate is chosen. The chosen sampling rate determines the frequency of the global clock, which is distributed over the fiber optic network.

The present invention also includes a method for providing a networked sensor system including the steps of serially passing data and clock signals in opposite directions, the sensor processing modules receiving signals from respective sensors and data packets from another sensor processing module, operating on the received data packets according to instructions from a central processing unit and forwarding the data packets to another one of the sensor processing modules over a fiber optic network. The central processing unit commanding the sensor processing modules via the fiber optic network as to what processing it should perform on its sensor data and where in the data packet it should place its data. The method also includes performing narrowband and broadband Fast Fourier Transforms on the data, forming coherent sums of data from any of the sensors on the fiber optic network, and sampling an output from a low noise signal conditioning unit by an analog-to-digital converter. The sampling occurs at a programmable rate determined by a global clock.

Thus, the present invention provides a system and method for data acquisition and distributed processing in which data is processed locally. This allows for a higher sampling rate, reduction in the quantity of data transmitted on a single media, and enables more sensors and sensor processing modules to be connected. It also reduces the amount of data to be processed centrally, thereby reducing the size and cost of the central processor.

These objects, together with other objects and advantages which will be subsequently apparent, reside in the details of construction and operation as more fully described and claimed hereinafter, reference being had to the accompanying drawings forming a part hereof, wherein like reference numerals refer to like parts throughout.

DESCRIPTION OF THE PREFERRED EMBODIMENTS

Figure 1:
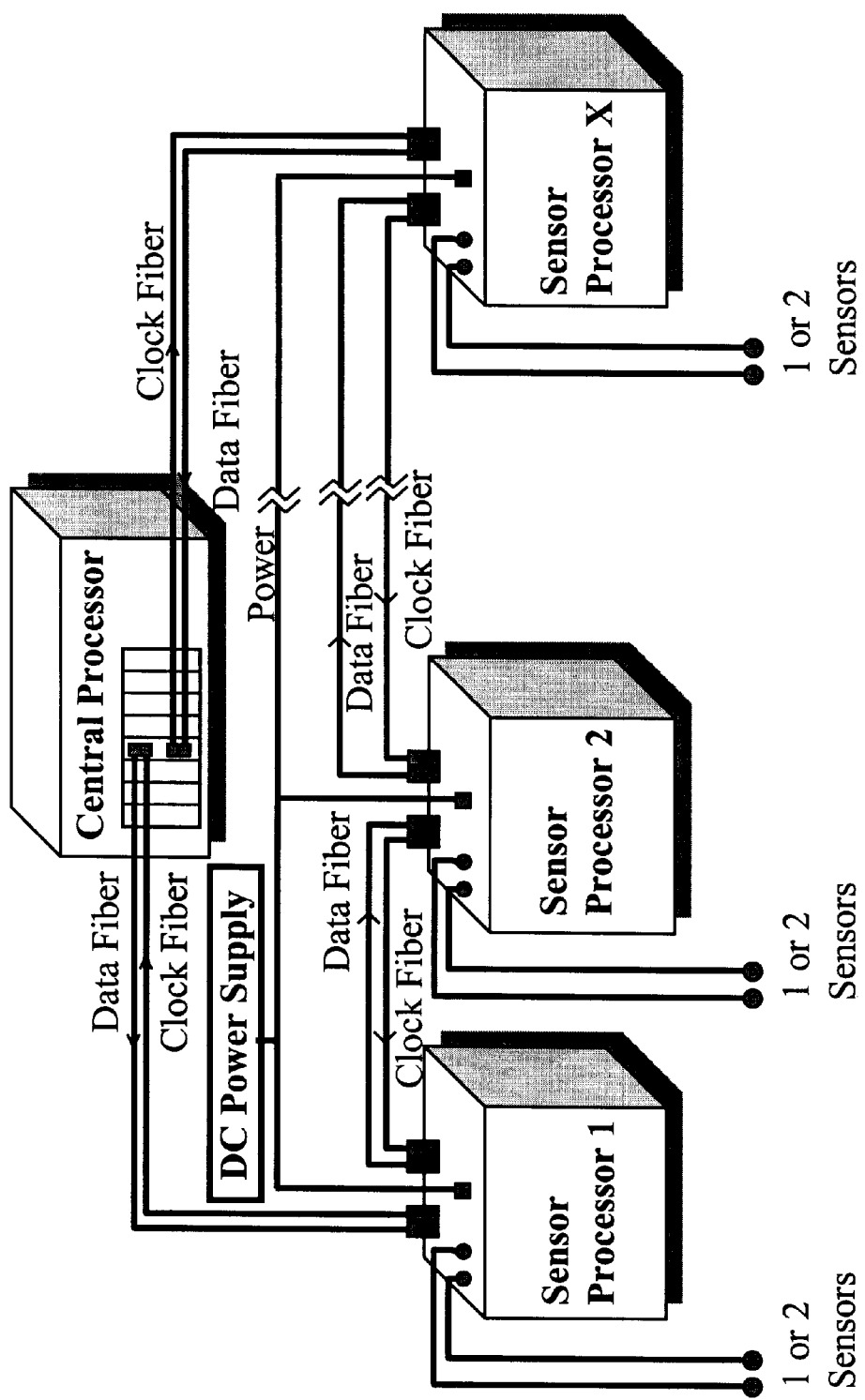
FIG. 1 is a block diagram of the networked sensor system according to the present invention.

FIG. 1 is a block diagram of the networked sensor system 10 of the present invention. Fiber optic cables, including a data fiber 12 and a clock fiber 14, in a fiber optic network serially connect a series of sensor processing modules 16. The number of sensor processing modules 16 used is based on the application of the system and can be from one to several thousand. Each of the sensor processing modules 16 has a maximum of two sensors 18 attached thereto, but can be modified to accept more. The number of sensor processing modules 16, sensors 18, and their respective locations are stored in a configuration record in a central processing unit 20 and can be easily modified by the user. Data is passed from one sensor processing module 16 to another sensor processing module 16 as a data packet. Each packet contains a data field and header bits. The data field contains information relevant to packet types such as sum data, individual sensor samples, energy footprint data, command data, etc. Thus, each sensor processing module 16 constantly acquires, processes and stores data from respective sensors 18. The central processing unit 20 can change the sampling rate of the sensors 18 by changing the clock signal. Each sensor processing module 16 also constantly receives data packets from another sensor processing module 16. Each sensor processing module 16 inserts data into the packets and forwards the packet. This occurs simultaneously with the sensor data processing. A global clock 19 synchronizes all data processing and permits synchronous sampling throughout the networked sensor system 10. The data packets are then transmitted to a next sensor processing module 16 connected in the fiber optic loop.

The sensor processing modules 16 also form coherent sums of data from sensor subsets on the fiber optic loop 12. The central processing unit 20 dynamically controls which sensors 18 contribute to the sum using a command over the fiber optic network.

A DC power supply 22 is connected to the sensor processing modules 16. The sensor processing modules 16 accept and distribute the DC power to the sensors 18. The input voltage requirements range between approximately 18–72 volts. The voltage chosen depends on the sensors 18 and the number of sensor processing modules 16 being used.

The central processing unit 20 controls the networked sensor system 10. As noted above, the central processing unit 20 has stored files that describe the number and layout of the sensor processing modules 16 and their associated sensors 18. This allows reconfiguration to suit the application. The central processing unit 20 can download code to the sensor processing modules 16 to modify processing functions for a given application. Sensor gain in the sensor processing modules 16 is programmed dynamically as commanded by the central processing unit 20. The fiber optic network forms a closed loop with the two fiber optic cables 12 and 14 that run from the central processing unit 20 through each sensor processing module 16 and back to the central processing unit 20. If a sensor processing module 16 detects a fault and stops receiving data, it automatically sends a message to the central processing unit 20 as to the nature and location of the problem. The central processing unit 20 can also download new programs over the network, thus providing new processing functions within minutes. In addition, a daisy-chain wiring scheme simplifies the connection to the central processing unit 20 and facilitates the location of the sensor processing modules 16 near their associated sensors 18 thereby minimizing cabling costs requirements. The present invention uses numerous local module-to-module data paths connected in the daisy chain arrangement to provide data transmission on any local path at any time without fear of collisions with data elsewhere in the loop. This arrangement also permits every sensor processing module 16 to communicate simultaneously with its neighbor and provides totally independent data transmission paths between sensor processing modules 16. However, aside from the latency and buffering requirements, the architecture of the present invention imposes no restrictions on the physical size of the loop or the number of sensor processing modules 16 that the networked sensor system 10 contains.

Figure 2:
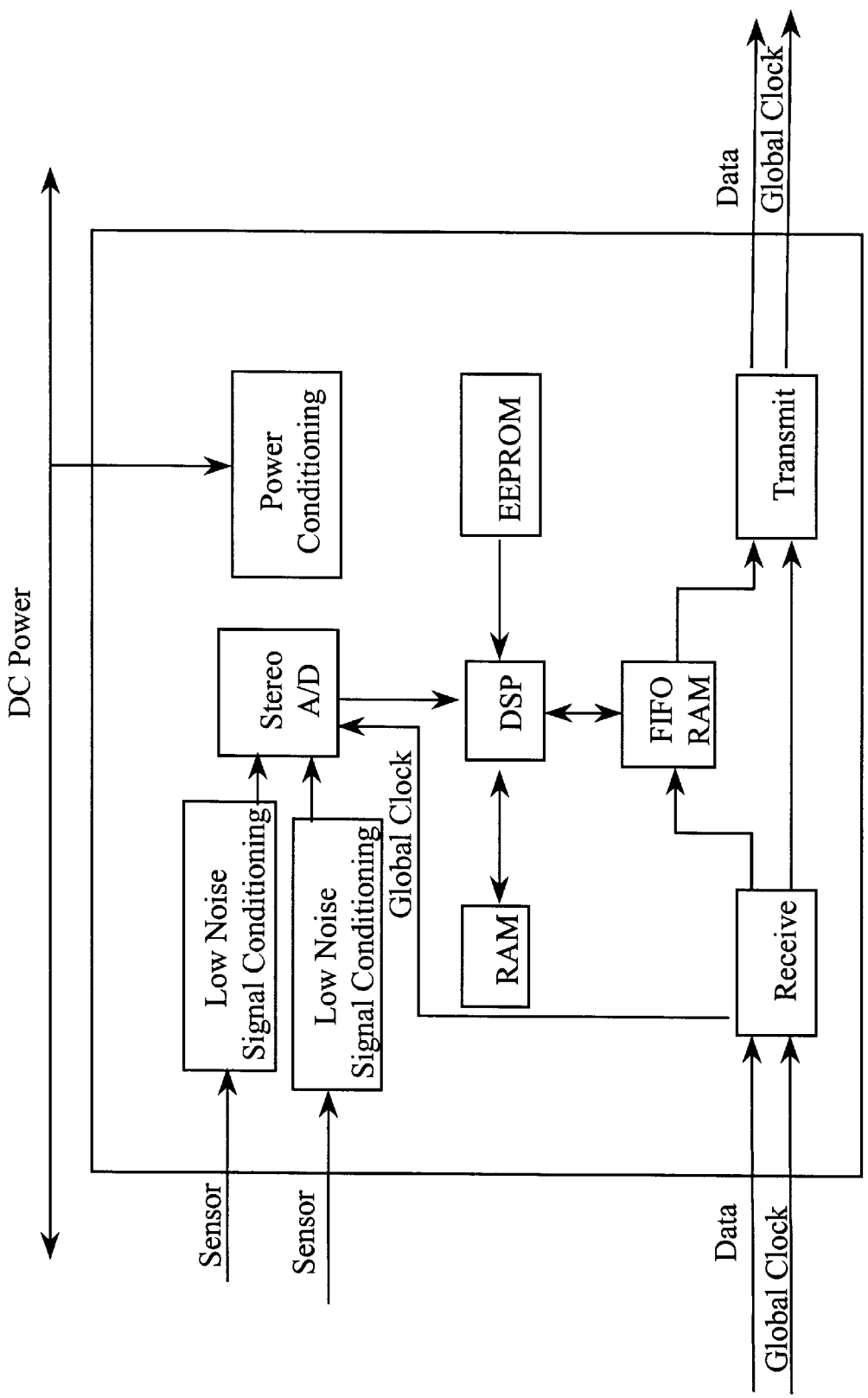
FIG. 2 is a block diagram of the sensor processing modules.

As shown in FIG. 2, each sensor processing module 16 includes a low noise signal conditioning unit 30 having a programmable gain for each of the sensors 18, respectively, a stereo analog-to-digital (A/D) converter 32, and a digital signal processor (DSP) 34. A power conditioning unit 36 is also provided. The power conditioning unit 36 derives analog and digital supply voltages required by the sensor processing modules 16 from a main DC power distribution bus 38. The sensor input is flexible and can support a sensor requiring a constant voltage or constant current power scheme. No power can be supplied with just the signal being received.

The low noise signal conditioning units 30 condition and amplify the low level input signals from the sensors 18. They also provide a buffered output for external use. The central processing unit 20 dynamically controls the programmable gain of the low noise signal conditioning units 30 using a command over the fiber optic network. The stereo A/D converter 32 is a high resolution converter that samples the output from the low noise signal conditioning units 30 at a programmable rate and outputs a digital signal. The central processing unit 20 generates and selects the sampling rate of the global clock 19. This allows many different types of sampling rates. The fiber optic network distributes the global clock 19 to the stereo A/D converter 32 via a receiver 40. The global clock 19 enables synchronous sampling of data throughout the network with a very low sample time skew. Assuming an average distance of 30 feet between sensor processing modules 16 results in a propagation time of approximately 46 ns. A data clock of 125 MHz yields a 32 bit data word serial transmission time of approximately 0.32 $\mu$s if the TAXI protocol (4B/5B encoding) is used. A sample clock of 25 kHz corresponds to a 40 $\mu$s sample period. This interval includes the packet propagation time from the previous sensor processing module 16 and time for the current sensor processing module 16 to receive, manipulate and queue the packet for transmission to the next sensor processing module 16. Software in the system modifies, for example, the number of sensor processing modules 16, the number of sensors 18, the functions being performed, and the location of the sensor processing modules 16. A display (not shown) can be provided showing the location of the sensors 18 and which sensors 18 are being used to gather data.

Each sensor processing module 16 will know the sums to which it will contribute and where they are located in the data packet. The sensor processing module 16 adds its sample to the existing sum in the packet and forwards the resulting sum to the next sensor processing module 16. The sensor processing module 16 also knows whether its individual data samples or its energy footprint should be reported in the data packet. It also has this information stored from commands sent from the central processing unit 20.

To report a single sample value, each sensor processing module 16 simply retrieves the sample value from memory and places it in the packet data field. The sensor processing modules 16 requested to report energy footprint data will involve long and short Fast Fourier Transforms (FFTs) and other processing. This time does not add to the packet handling time because the FFTs are computed in the background when not processing packets. Then the FFT data is ready by the time it is requested for the data packet.

The digital signal processor (DSP) 34 performs requisite broadband and narrowband FFTs and summing operations on digitized sensor data stored in a RAM 42. The digital signal processor (DSP) 34 also processes the data according to a program stored in a non-volatile (FLASH EEPROM) memory 44. Multiple programs reside in the FLASH EEPROM memory 44. As noted above, the central processing unit 20 can switch the program running on any and all digital signal processors 34 within seconds by way of a command over the fiber optic network.

The sensor processing module 16 then telemeters the data over the multimode fiber optic cable to a next sensor processing module 16. When a data packet is received by a sensor processing module 16 it is stored in RAM 46. Multiple packets can be stored at any one time because the digital signal processor (DSP) 34 deciphers the packets in the order in which they were received, like a first-in-first out (FIFO) device. Therefore, when the sensor processing module 16 is finished processing a data packet, data may be transmitted from the sensor processing module 16 to a next sensor processing module 16, via a transmitter 48, without verifying that the second sensor processing module 16 has finished processing the previous data packet.

When a failure occurs within a sensor processing module 16, the next sensor processing module 16 in the loop will send an error message to the central processing unit 20, regarding the location of the fault. A relay can be added so that data is automatically passed through the malfunctioning sensor processing module 16 upon a failure, but this will increase module costs.

The transceiver for the system can be any type that is readily available. In the present invention, the system was designed using TAXI protocol. However, the latest SONET technology can easily be used. The sensors 18 can also be of any type. In the embodiment of the present invention set forth as an example in this specification, the sensors 18 are accelerometers. They operate at a bandwidth within the audio bandwidth. The exact bandwidth depends upon the A/D converter 32 that is selected and used.

The present invention provides a networked sensor system 10 that can include a processor dedicated to each sensor. The processor is small and can be located within inches of the sensor. The processor integrates the output of its associated sensor into the data channels required by the system. All outputs are digital over fiber optic medium, thus minimizing EMI. The processors are daisy chained together forming a large loop throughout the system, thereby minimizing cabling and installation costs. Multiple loops can also be utilized for cabling convenience.

The present invention also uses commercially available products. This provides a highly flexible, powerful distributed sensor processing system that minimizes cabling requirements, significantly reduces centralized equipment space requirements, is affordable, easily maintained and is resistant to EMI. The present invention also allows low cost and easy back fitting of existing sensor systems. Additionally, the present invention can be used in numerous environments including, but not limited to, manufacturing, entertainment and audio industries.

The foregoing is considered as illustrative only of the principles of the invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention and the appended claims and their equivalents.

We claim:

1. A networked sensor system for continuous, high speed, real time, data acquisition, said system comprising:

central processing means;

distributed sensor processing means, coupled to said central processing means, for serially passing data over a first fiber optic cable and a global clock signal over a second fiber optic cable in opposite directions between respective sensor processing means and said central processing means, said global clock signal synchronizing all said sensor processing means for simultaneous data acquisition;

sensors attached to said sensor processing means; and a power supply, connected to said sensor processing means, for supplying power to said sensor processing means.

2. A networked sensor system according to claim 1, wherein said central processing means has configuration files stored therein and wherein said networked sensor system dynamically defines the number of said sensors, sensor processing means, and their respective locations via one of said configuration files, allowing all sensor processing means to be interchangeable and configurable on demand.

3. A networked sensor system according to claim 2, wherein said sensor processing means includes:

a low noise signal conditioning unit, operatively connected to said sensors, for amplifying low level signals from said sensors and providing a buffered output;

an analog-to-digital converter, operatively connected to said low noise signal conditioning unit, for sampling the output from said low noise signal conditioning unit;

a processor, operatively connected to said central processing means, for processing data according to programs stored in said central processing means; and fiber optic communication means, serially connecting said sensor processing means, for passing said data packets and said global clock.

4. A networked sensor system according to claim 3, wherein said low noise signal conditioning unit is controlled by said central processing means.

5. A networked sensor system according to claim 4, wherein said analog-to-digital converter samples at a programmable rate determined by said global clock signal.

6. A networked sensor system according to claim 4, wherein said central processing means generates and selects a sampling rate of said global clock.

7. A networked sensor system according to claim 4, wherein said sensor processing means perform narrowband and broadband Fast Fourier Transforms (FFTs) on the data.

8. A networked sensor system according to claim 7, wherein the data is processed according to a program in a nonvolatile memory in said sensor processing means.

9. A method for providing a networked sensor system, said method comprising the steps of:

a) collecting data at specified locations using sensors;

b) sensor processors receiving data from respective sensors and receiving data packets from respective sensor processors;

c) passing data and data packets from the sensor processors and a global clock signal between serially connected sensor processors over fiber optic cable; and d) operating on the received data packets according to instructions from a central processing unit, the central processing unit having configuration files stored therein;

e) dynamically defining the number of sensors and sensor processors and their location according to one of the configuration files on the central processing unit; and f) allowing all sensor processors to be interchangeable and configurable on demand.

10. A method according to claim 9, further comprising the steps of:

g) performing functions, determined by software, on the data; and h) forming coherent sums of data from any of the sensors on the fiber optic network.

11. A method according to claim 10, wherein in said step g) the functions are easily modified by downloading code from the central processing unit.

12. A method according to claim 11, wherein said step g) further includes performing narrowband and broadband Fast Fourier Transforms (FFTs) on the data.

13. A method according to claim 10, further comprising the step of switching, within seconds, programs running on any and all sensor processors.

14. A method according to claim 10, further comprising the step of sampling an output from a programmable low noise signal conditioning unit by an analog-to-digital converter.

15. A method according to claim 13, wherein said sampling step includes sampling the output at a programmable rate determined by the global clock.

16. A method according to claim 14, further comprising the step of switching programs, by the central processing unit, on any and all sensor processing modules using a command over the fiber optic network.

17. A method according to claim 15, further comprising the step of dynamically controlling which sensors contribute data over the fiber optic network.

18. A networked sensor system for continuous, high speed, real time, data acquisition, said system comprising:

sensor processing modules passing data and a global clock, the global clock synchronizing all the sensor processing modules for simultaneous data acquisition;

fiber optic cables serially connecting said sensor processing modules together, for passing the data and the global clock;

sensors, connected to said sensor processing modules, for sensing data input to said sensor processing modules; and a central processing unit, operatively connected to said sensor processing modules, for commanding said sensor processing modules.

19. A networked sensor system providing continuous, high speed, real time, data acquisition, said system comprising:

a fiber optic network;

a network of distributed sensor processing modules for serially passing data on a first fiber optic cable and a global clock signal on a second fiber optic cable, said global clock signal synchronizing all sensor processing modules in said network of distributed sensor processing modules;

sensors, coupled to each of said sensor processing modules, for obtaining data to be processed; and a central processor, coupled to said network of distributed sensor processing modules, switching programs running on said sensor processing modules on demand via a command over said fiber optic network and dynamically controlling which sensors contribute data over said fiber optic network.

20. A networked sensor system according to claim 19, wherein sensor processing modules in said network of sensor processing modules simultaneously sample data with said global clock signal.

21. A networked sensor system according to claim 20, wherein each of said distributed sensor processing modules inserts data into data packets and forwards said data packets simultaneously with said data from said sensors.

* * * * *